(12) United States Patent  (10) Patent No.: US 12,462,715 B2
Spencer  (45) Date of Patent: Nov. 4, 2025

(54) ILLUMINATED SAFETY FLAG DEVICE

(71) Applicant: Dennis Spencer, Landenberg, PA (US)

(72) Inventor: Dennis Spencer, Landenberg, PA (US)

( * ) Notice: Subject to any disclaimer, the term of this patent is extended or adjusted under 35 U.S.C. 154(b) by 178 days.

(21) Appl. No.: 18/449,029

(22) Filed: Aug. 14, 2023

(65) Prior Publication Data
US 2024/0304121 A1 Sep. 12, 2024

Related U.S. Application Data

(60) Provisional application No. 63/450,217, filed on Mar. 6, 2023.

(51) Int. Cl.
G09F 13/00 (2006.01)
B64C 25/00 (2006.01)
G09F 13/16 (2006.01)

(52) U.S. Cl.
CPC .......... G09F 13/005 (2013.01); B64C 25/001 (2013.01); G09F 13/16 (2013.01)

(58) Field of Classification Search
CPC .. G09F 13/005; G09F 13/16; G09F 2013/222; B64C 25/001; B64C 25/28
See application file for complete search history.

(56) References Cited

U.S. PATENT DOCUMENTS

| | | | |
|---|---|---|---|
| 2,184,004 A | 12/1939 | Pennow | |
| 3,305,961 A | 2/1967 | Lanzon | |
| 3,678,260 A | 7/1972 | Beal | |
| 3,796,869 A * | 3/1974 | Stone | F21V 13/08 |
| | | | 362/382 |
| 6,008,742 A | 12/1999 | Groves | |
| 6,278,382 B1 | 8/2001 | DeMarco | |
| 6,283,611 B1 * | 9/2001 | Sharrah | F21V 15/01 |
| | | | 362/186 |
| 8,893,414 B1 * | 11/2014 | Zachorne | G08B 5/006 |
| | | | 40/555 |
| 9,990,871 B1 * | 6/2018 | Marques | G09F 13/22 |
| 2003/0206410 A1 * | 11/2003 | Parsons | F21L 4/08 |
| | | | 362/183 |
| 2005/0018420 A1 * | 1/2005 | Parsons | F21L 4/027 |
| | | | 362/191 |
| 2010/0027281 A1 | 2/2010 | Waters | |
| 2014/0045395 A1 * | 2/2014 | Cannici | B63C 9/115 |
| | | | 441/89 |
| 2019/0057629 A1 * | 2/2019 | Kicera | G09F 23/00 |
| 2019/0073900 A1 * | 3/2019 | Colbert | F21V 33/008 |
| 2020/0068688 A1 * | 2/2020 | Knauss | H05B 47/19 |
| 2020/0116314 A1 * | 4/2020 | Grandadam | F21L 4/027 |
| 2020/0116319 A1 * | 4/2020 | Gallo, Jr. | F21V 23/0435 |
| 2021/0012690 A1 * | 1/2021 | General | H04N 23/57 |
| 2023/0140092 A1 * | 5/2023 | Moore | G09F 21/06 |
| | | | 40/583 |

* cited by examiner

Primary Examiner — Gary C Hoge
(74) Attorney, Agent, or Firm — Brennan, Manna & Diamond, LLC

(57) ABSTRACT

An illuminated safety flag device is disclosed. The device is comprised of a flag-like body that can be attached to the bypass pin (and/or landing gear pin) of an aircraft. Once attached, the device can be illuminated such that it draws attention to the pin to notify aircraft personnel that the pin has been inserted (or removed).

1 Claim, 2 Drawing Sheets

ILLUMINATED SAFETY FLAG DEVICE

CROSS-REFERENCE TO RELATED APPLICATION

The present application claims priority to, and the benefit of, U.S. Provisional Application No. 63/450,217, which was filed on Mar. 6, 2023, and is incorporated herein by reference in its entirety.

FIELD OF THE INVENTION

The present invention relates generally to the field of airplanes. More specifically, the present invention relates to an illuminated safety flag device that can be attached to the bypass pin (and aircraft landing gear) of an aircraft. The device can be attached to a bypass pin and is illuminated such that it draws attention to the pin to notify aircraft personnel that the pin has been inserted (and removed). Accordingly, the present disclosure makes specific reference thereto. Nonetheless, it is to be appreciated that aspects of the present invention are also equally applicable to other like applications, devices, and methods of manufacture.

BACKGROUND

Ground and flight deck personnel must know when the aircraft (Nose Gear & Landing Gear) bypass pin has been properly inserted or removed during the arrival and departure processes to prevent aircraft damage. Worker injury or even death can occur if the process is not performed. If said process is also not performed, delays can also occur. This, in turn, leads to frustrated passengers, which is undesirable.

Therefore, there exists a long-felt need in the art for a device that can be used to notify ground and flight deck personnel. More specifically, there exists a long-felt need in the art for an illuminated safety flag device that can be used to notify ground and flight deck personnel that an aircraft bypass pin (and gear pin) has been properly inserted (or removed). In addition, there exists a long-felt need in the art for an illuminated safety flag device that can be used to notify ground and flight deck personnel that an aircraft bypass pin has been properly inserted (or removed) by being clearly visible.

The subject matter disclosed and claimed herein, in one embodiment thereof, comprises an illuminated safety flag device. The device is comprised of a body with at least one light source and at least one battery. The device is designed to be attached to a (Nose gear) bypass pin (or landing gear pin) of an aircraft to alert airport personnel that the hydraulic nose gear bypass pin (and/or landing gear pin) has been properly inserted (or removed) into the aircraft during the receive and dispatch process. More specifically, the light source is an LED that can be illuminated in a color, brightness, and illumination pattern to draw attention to the fact that the pin has been inserted. The device can be secured to a bypass pin via a fastener that can be placed through an eyelet of the device. To further increase visibility, the device may be comprised of a reflective body and/or reflective indicia.

In this manner, the illuminated safety flag device of the present invention accomplishes all the foregoing objectives and provides a device that can be used to notify ground and flight deck personnel. More specifically, the device can be used to notify ground and flight deck personnel that an aircraft bypass (and/or landing gear pin) has been properly inserted. In addition, the device can be easily seen due to the LED light source.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an illuminated safety flag device primarily comprised of a body with at least one light source and at least one battery. The device is designed to be attached to a bypass pin (and/or landing gear pin) of an aircraft to alert airport personnel that the hydraulic nose gear bypass pin (and/or landing gear pin) has been properly inserted (or removed) into the aircraft during the receive and dispatch process. In order to attach the device to a hydraulic nose gear bypass pin (and/or landing gear pin), the body may be comprised of at least one eyelet that allows at least one fastener such as, but not limited to, a carabiner to attach to the device and to the pin.

The body of the device is preferably rectangular in shape and is preferably made of any woven and/or fabric material known in the art. In one embodiment, the body may be made from a reflective material to increase the visibility of the device. The body may be comprised of at least one indicia that is a contrasting color to that of the body to increase the visibility of the indicia. In another embodiment, the indicia is made from a reflective material to increase the visibility of the indicia.

The body is also comprised of at least one light source, which is preferably at least one LED light. The LED light may illuminate any color known in the art. The LED light is preferably comprised of at least one brightness level. The LED light may also be comprised of at least one illumination pattern such as, but not limited to, constant illumination or flashing illumination. In one embodiment, the color, brightness level, and illumination pattern can be configured via at least one button on the light source or by at least one remote.

The present invention is also comprised of a method of using the device. First, a device is provided comprised of a body with at least one light source and at least one battery. Then, the device can be attached to a hydraulic nose gear bypass pin (and/or landing gear pin) by attaching a fastener to the pin and through an eyelet of the device after the pin has been properly inserted. Then, the light source can be illuminated via the button and/or remote to indicate the pin was properly inserted. Before flight, the device can be removed from the pin.

Accordingly, the illuminated safety flag device of the present invention is particularly advantageous as it provides a device that can be used to notify ground and flight deck personnel. More specifically, the device can be used to notify ground and flight deck personnel that an aircraft bypass pin (and/or landing gear pin) has been properly inserted (or removed). In addition, the device can be easily seen due to the LED light source. In this manner, the illuminated safety flag device provides a solution to easily communicate a bypass pin that has been inserted into an aircraft.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
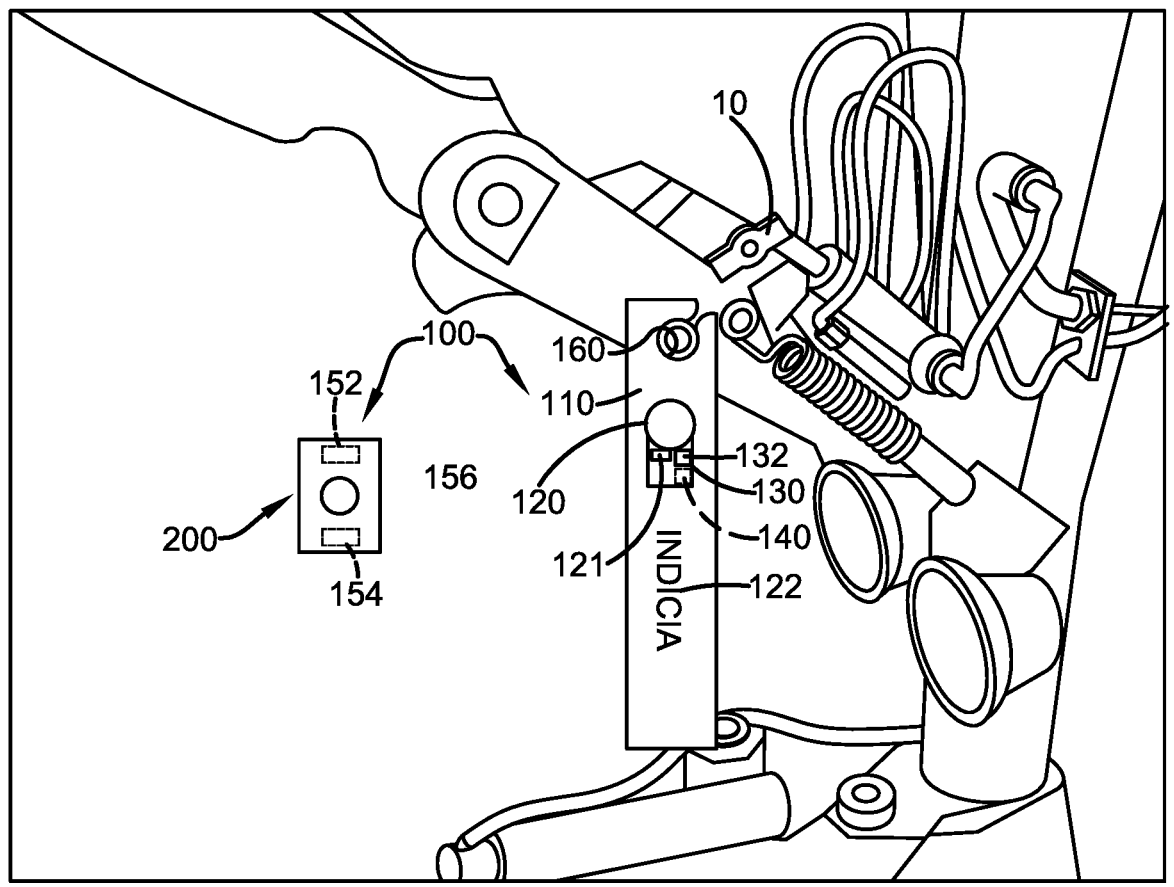
FIG. 1 illustrates a perspective view of one potential embodiment of an illuminated safety flag device of the present invention while attached to a bypass pin in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device that can be used to notify ground and flight deck personnel. More specifically, there exists a long-felt need in the art for an illuminated safety flag device that can be used to notify ground and flight deck personnel that an aircraft bypass pin (and/or landing gear pin) has been properly inserted (or removed). In addition, there exists a long-felt need in the art for an illuminated safety flag device that can be used to notify ground and flight deck personnel that an aircraft bypass pin has been properly inserted (and/or landing gear pin) by being clearly visible.

The present invention, in one exemplary embodiment, is comprised of an illuminated safety flag device. The device is primarily comprised of a body with at least one light source and at least one battery. The device is designed to be attached to a bypass pin (and/or landing gear pin) of an aircraft to alert airport personnel that the hydraulic nose gear bypass pin (and/or landing gear pin) has been properly inserted (or removed) into the aircraft during the receive and dispatch process. In order to attach the device to a hydraulic nose gear bypass pin (and/or landing gear pin), the body may be comprised of at least one eyelet. The eyelet allows at least one fastener such as, but not limited to, a carabiner to attach to the device and to the pin.

The body of the device is preferably rectangular in shape and is preferably made of any woven and/or fabric material known in the art. In one embodiment, the body may be made from a reflective material to increase the visibility of the device and/or may be comprised of at least one indicia that is a contrasting color to that of the body to increase the visibility of the indicia. In another embodiment, the indicia is made from a reflective material to increase the visibility of the indicia.

The body is also comprised of at least one light source, which is preferably at least one LED light that may illuminate any color known in the art. The LED light is preferably comprised of at least one brightness level. The LED light may also be comprised of at least one illumination pattern such as, but not limited to, constant illumination or flashing illumination. In one embodiment, the color, brightness level, and illumination pattern can be configured via at least one button on the light source or by at least one remote.

The present invention is also comprised of a method of using the device. First, a device is provided comprised of a body with at least one light source and at least one battery. Then, the device can be attached to a hydraulic nose gear bypass pin (and/or landing gear pin) by attaching a fastener to the pin and through an eyelet of the device after the pin has been properly inserted (or removed). Then, the light source can be illuminated via the button and/or remote to indicate the pin was properly inserted. Before flight, the device can be removed from the pin.

Accordingly, the illuminated safety flag device of the present invention is particularly advantageous as it provides a device that can be used to notify ground and flight deck personnel. More specifically, the device can be used to notify ground and flight deck personnel that an aircraft bypass pin (and/or landing gear pin) has been properly inserted. In addition, the device can be easily seen due to the LED light source. In this manner, the illuminated safety flag device provides a solution to easily communicate that a bypass pin (and/or landing gear pin) has been inserted (or removed) into an aircraft.

Referring initially to the drawings, FIG. 1 illustrates a perspective view of one potential embodiment of an illuminated safety flag device 100 of the present invention while attached to a bypass pin 10 in accordance with the disclosed architecture. The device 100 is primarily comprised of a body 110 with at least one light source 120 and at least one battery 130. The device 100 is designed to be attached to a bypass pin (and/or landing gear pin) 10 of an aircraft to alert airport personnel that the hydraulic nose gear bypass pin (and/or landing gear pin) 10 has been properly inserted (or removed) into the aircraft during the receive and dispatch process.

The body 110 of the device 100 is preferably rectangular in shape, but may be any shape known in the art. The body 110 is preferably made of any woven and/or fabric material known in the art. In one embodiment, the body 110 may be made from a reflective material to increase the visibility of the device 100. The body 110 may be of any color known in the art, but preferably of a highly visible color such as, but not limited to, a neon shade.

The body 110 may be comprised of at least one indicia 122. The indicia 122 may be a contrasting color to that of the body 110 to increase the visibility of the indicia 122. In another embodiment, the indicia 122 is made from a reflective material to increase the visibility of the indicia 122. The indicia 122 may be a word, a symbol, a phrase, etc. However, the indicia 122 is preferably the phrase "remove before flight" to indicate to airport personnel to remove the device 100 from a hydraulic nose gear bypass pin (and/or landing gear pin) 10 that it has been attached to.

The body 110 is also comprised of at least one light source 120. The light source 120 is preferably at least one LED light. The LED light may illuminate any color known in the art. The LED light is preferably comprised of at least one brightness level. The LED light may also be comprised of at least one illumination pattern such as, but not limited to, constant illumination or flashing illumination. In one embodiment, the color, brightness level, and illumination pattern can be configured via at least one button 121 on the light source 120.

In another embodiment, the functions of the light source 120 such as, but not limited to, the color, brightness level, and illumination pattern of the light source 120 may be configured via at least one remote 150. The remote 150 is comprised of at least one transmitter 152 in wireless electrical communication with at least one receiver 140 of the light source 120 via Wi-Fi, Bluetooth, RFID, etc. The color, brightness level, and illumination pattern of the light source 120 may be selected by at least one button 156 of the remote 150. The remote 150 may receive power from at least one battery 154. In one embodiment, the battery 154 can be recharged via a charging port of any type known in the art such as, but not limited to, a USB port.

The light source 120 receives power from at least one battery 130. The battery 130 may be a disposable battery 130 or a rechargeable battery 130 in the form of an alkaline, nickel-cadmium, nickel-metal hydride battery 130, etc., such as any 3V-12 volts DC battery 130 or other conventional battery 130 such as A, AA, AAA, etc., that supplies power to the device 100. Throughout this specification the terms "battery" and "batteries" may be used interchangeably to refer to one or more wet or dry cells or batteries 130 of cells in which chemical energy is converted into electricity and used as a source of DC power. References to recharging or replacing batteries 130 may refer to recharging or replacing individual cells, individual batteries 130 of cells, or a package of multiple battery cells as is appropriate for any given battery 130 technology that may be used. Additionally, the battery 130 may be recharged by at least one charging port 132. The charging port 132 may be any charging port known in the art such as, but not limited to, a USB port.

In order to attach the device 100 to a hydraulic nose gear bypass pin (and/or landing gear pin) 10, the body 110 may be comprised of at least one eyelet 160. The eyelet 160 allows at least one fastener such as, but not limited to, a carabiner to attach to the device 100 and to the pin 10.

Figure 2:
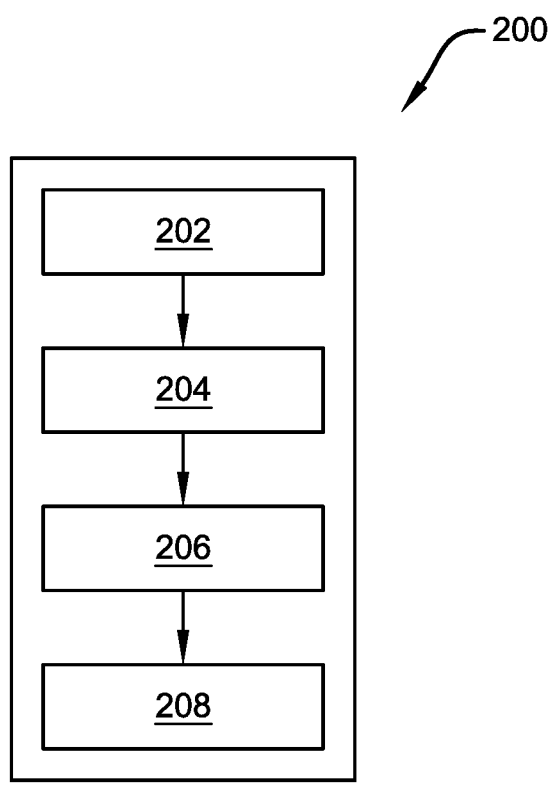
FIG. 2 illustrates a flowchart of a method of using one potential embodiment of an illuminated safety flag device of the present invention in accordance with the disclosed architecture.

The present invention is also comprised of a method of using 200 the device 100, a seen in FIG. 2. First, a device 100 is provided comprised of a body with at least one light source 120 and at least one battery 130 [Step 202]. Then, the device 100 can be attached to a hydraulic nose gear bypass pin (and/or landing gear pin) 10 via attached a fastener to the pin 10 and through an eyelet 160 of the device 100 after the pin 10 has been properly inserted [Step 204]. Then, the light source 120 can be illuminated via the button 121 and/or remote 150 to indicate the pin 10 was properly inserted [Step 206]. Before flight, the device 100 can be removed from the pin 10 [Step 208].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "illuminated safety flag device" and "device" are interchangeable and refer to the illuminated safety flag device 100 of the present invention.

Notwithstanding the foregoing, the illuminated safety flag device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the illuminated safety flag device 100 as shown in the FIGS. are for illustrative purposes only, and that many other sizes and shapes of the illuminated safety flag device 100 are well within the scope of the present disclosure. Although the dimensions of the illuminated safety flag device 100 are important design parameters for user convenience, the illuminated safety flag device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of using an illuminated safety flag device, the method comprising the following steps:
   providing an illuminated safety flag device comprised of a body with a light source and a battery;
   attaching the illuminated safety flag device to a hydraulic nose gear bypass pin of an airplane by attaching a fastener to the hydraulic nose gear bypass pin and through the eyelet after the hydraulic nose gear bypass pin has been properly inserted into the airplane;
   illuminating the light source via a button or a remote of the illuminated safety flag device to indicate the hydraulic nose gear bypass pin was properly inserted; and
   removing the illuminated safety flag device from the hydraulic nose gear bypass pin.

* * * * *